US012331795B1

(12) United States Patent
Yaguchi

(10) Patent No.: US 12,331,795 B1
(45) Date of Patent: Jun. 17, 2025

(54) DRIVING DEVICE

(71) Applicant: GKN Automotive Limited, Birmingham (GB)

(72) Inventor: Yuu Yaguchi, Tochigi (JP)

(73) Assignee: GKN Automotive Limited, Birmingham (GB)

( * ) Notice: Subject to any disclaimer, the term of this patent is extended or adjusted under 35 U.S.C. 154(b) by 0 days.

(21) Appl. No.: 18/915,499

(22) Filed: Oct. 15, 2024

(30) Foreign Application Priority Data

Apr. 25, 2024 (JP) ................. 2024-071125

(51) Int. Cl.
*F16D 28/00* (2006.01)
*F16D 13/74* (2006.01)
*F16D 23/12* (2006.01)
*F16D 125/36* (2012.01)
*F16H 48/34* (2012.01)
*F16H 57/04* (2010.01)

(52) U.S. Cl.
CPC .............. *F16D 28/00* (2013.01); *F16D 13/74* (2013.01); *F16D 2023/123* (2013.01); *F16D 2125/36* (2013.01); *F16D 2300/18* (2013.01); *F16H 48/34* (2013.01); *F16H 2048/343* (2013.01); *F16H 57/0483* (2013.01)

(58) Field of Classification Search
CPC .......... F16D 28/00; F16D 13/72; F16D 13/74; F16D 2023/123; F16D 2300/18; F16D 27/118; F16D 27/14; F16H 48/34; F16H 48/343; F16H 48/0483
See application file for complete search history.

(56) References Cited

U.S. PATENT DOCUMENTS

| 10,955,015 | B2 * | 3/2021 | Seidl .................. F16D 48/06 |
| 2004/0132572 | A1 | 7/2004 | Ludwig et al. |
| 2005/0250613 | A1 | 11/2005 | Ludwig et al. |
| 2011/0166760 | A1 * | 7/2011 | Kiessner-Haiden .......... F16D 48/064 701/68 |
| 2017/0030419 | A1 * | 2/2017 | Mitsubori .......... F16D 25/10 |
| 2019/0072142 | A1 * | 3/2019 | Kato .................. F16D 48/06 |
| 2019/0115865 | A1 * | 4/2019 | Inokuma ............. H02K 11/25 |
| 2022/0325786 | A1 * | 10/2022 | Davis ................ F16H 48/34 |
| 2024/0348122 | A1 * | 10/2024 | Iwata ................. H02K 3/46 |

FOREIGN PATENT DOCUMENTS

JP 2004211899 A 7/2004
WO WO-2021044513 A1 * 3/2021

* cited by examiner

*Primary Examiner* — Timothy Hannon
(74) *Attorney, Agent, or Firm* — Reising Ethington P.C.

(57) ABSTRACT

A drive device includes a housing a pair of rotating members, a connection and disconnection portion, and an actuator. In the housing, lubricating oil is accommodated. The pair of rotating members is accommodated in the housing so as to be capable of rotating relative to one another. The connection and disconnection portion connects and disconnects power transmitted between the pair of rotating members. The actuator is accommodated in the housing and has an electric component that actuates the connection and disconnection portion. The electric component is provided with a temperature sensor that detects a temperature inside the housing.

4 Claims, 2 Drawing Sheets

DRIVING DEVICE

CROSS REFERENCE TO RELATED APPLICATIONS

This application is based on and claims priority under 35 USC 119 from Japanese Patent Application No. 2024-071125 filed on Apr. 25, 2024, the entire content of which is incorporated herein by reference.

TECHNICAL FIELD

The present disclosure relates to a drive device.

BACKGROUND

JP2004-211899A discloses a drive device. The drive device includes a housing that accommodates lubricating oil, and a gear case and a side gear. The gear case and the side gear are a pair of rotating members that are accommodated in the housing and can rotate relative to one another. The drive device also includes a connection and disconnection portion that connects and disconnects power transmitted between the gear case and the side gear. The drive device includes an actuator accommodated in the housing. The actuator has an electromagnetic coil as an electric component that actuates the connection and disconnection portion.

In the drive device, the electromagnetic coil is electrically connected to a controller that controls supply of electricity to the electromagnetic coil via a lead wire that is pulled outside the housing. In the drive device, a connection and disconnection state of the connection and disconnection portion is controlled by a state of electricity supply to the electromagnetic coil, which is controlled by the controller.

In drive devices such as that described in JP2004-211899A, a temperature of a connection and disconnection portion may be measured, and a connection and disconnection state of the connection and disconnection portion may be controlled in accordance with the temperature of the connection and disconnection portion, thereby stabilizing connection and disconnection characteristics of the connection and disconnection portion. However, because the connection and disconnection portion is a rotating member, a temperature sensor electrically connected to the controller via the lead wire cannot be disposed directly in the connection and disconnection portion.

Therefore, the temperature sensor is placed, for example, on a surface located near the connection and disconnection portion outside the housing, which is a stationary component, or in a lubricating oil reservoir located inside the housing near the connection and disconnection portion, and the temperature of the connection and disconnection portion is estimated. However, when placing a temperature sensor outside the housing, layout may be limited by surrounding components, and thus a structure of the housing becomes complicated in order to secure space for placing the temperature sensor. In addition, a surface temperature outside the housing has low accuracy in estimating the temperature of the connection and disconnection portion located inside the housing. Further, when placing the temperature sensor in the lubricating oil reservoir inside the housing, it is necessary to consider a lubricating environment of the lubricating oil and to provide a structure to pull out a new lead wire into the housing.

SUMMARY

The present disclosure relates to a drive device in which an accuracy of estimating a temperature of a connection and disconnection portion is maintained without complicating a housing structure.

In accordance with non-limiting embodiments of the present disclosure, a drive device includes a housing, a pair of rotating members, a connection and disconnection portion, and an actuator. In the housing, lubricating oil is accommodated. The pair of rotating members is accommodated in the housing so as to be capable of rotating relative to one another. The connection and disconnection portion connects and disconnects power transmitted between the pair of rotating members. The actuator is accommodated in the housing and has an electric component that actuates the connection and disconnection portion. The electric component is provided with a temperature sensor that detects a temperature inside the housing.

According to the non-limiting embodiments, it is possible to provide a drive device that can maintain the accuracy of estimating the temperature of the connection and disconnection portion without complicating the housing structure.

BRIEF DESCRIPTION OF DRAWINGS

The following detailed description of certain embodiments and best mode will be set forth with reference to the accompanying drawings, in which.

DETAILED DESCRIPTION

Figure 1:
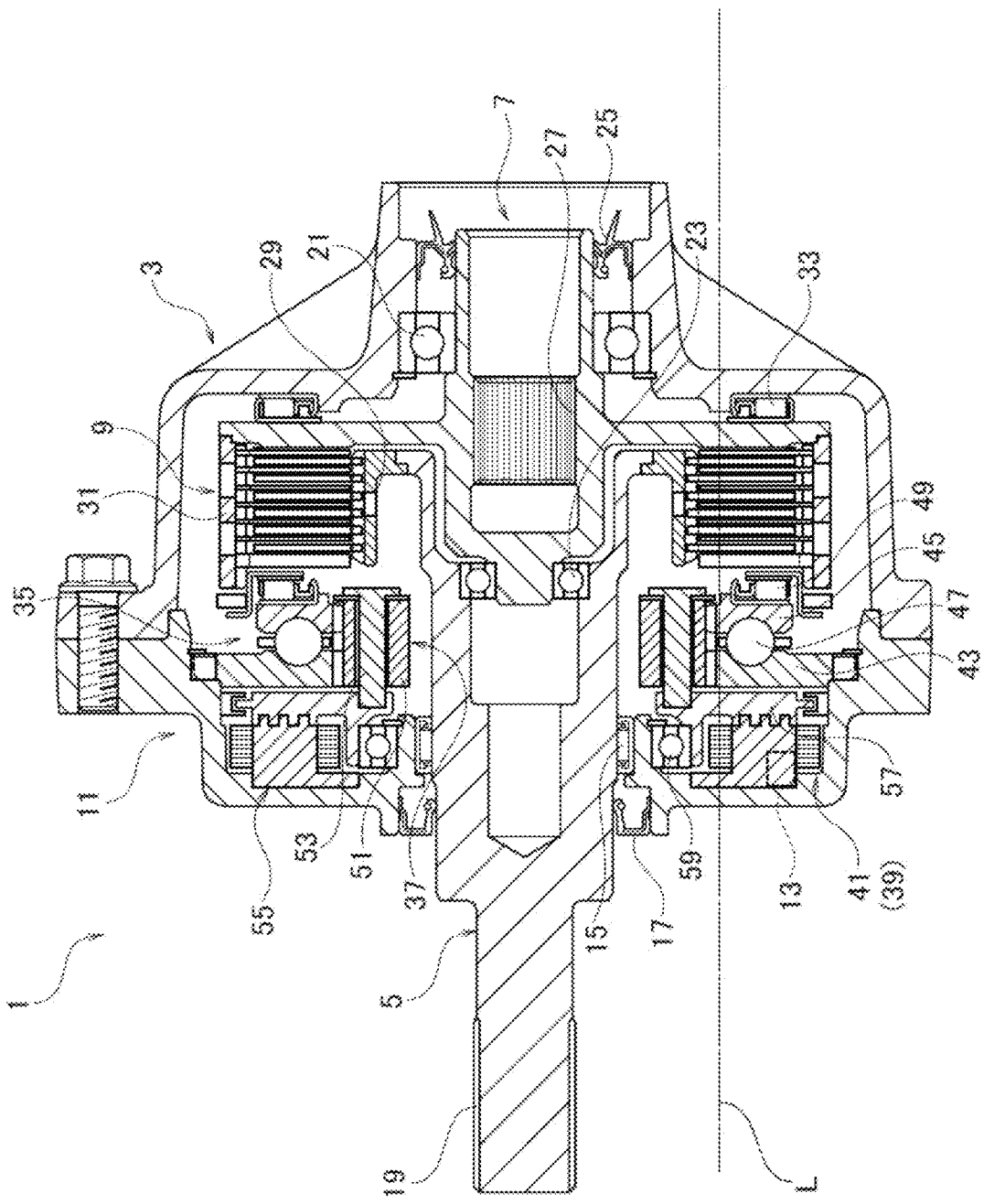
FIG. 1 is a cross-sectional view of a drive device according to a first embodiment.

Drive devices according to example, non-limiting embodiments will be described in detail below with reference to the drawings. A dimensional proportion in the drawings may be exaggerated for convenience of explanation and may differ from an actual proportion.

A first embodiment will be described with reference to FIG. 1. As illustrated in FIG. 1, a drive device 1 according to the first embodiment is disposed, for example, between an input side mechanism and an output side mechanism in a power transmission path of a vehicle. The drive device 1 has a connection and disconnection portion 9 that allows and prevents transmission of a driving force from the input side mechanism to the output side mechanism. When the connection and disconnection portion 9 is in a connected state, the drive device 1 is able to transmit a driving force from the input side mechanism to the output side mechanism. On the other hand, when the connection and disconnection portion 9 is in a disconnected state, the drive device 1 cuts off the transmission of a driving force from the input side mechanism to the output side mechanism.

As illustrated in FIG. 1, the drive device 1 includes a housing 3, a pair of rotating members consisting of a first rotating member 5 and a second rotating member 7, a connection and disconnection portion 9, an actuator 11, and a temperature sensor 13.

The housing 3 is a stationary component fixed to the vehicle and is made up of a plurality of divided components. The plurality of divided components are fixed via a plurality of bolts to form an internal accommodation space for accommodating each component. The housing 3 accommodates lubricating oil that lubricates and cools sliding parts of each component and meshing parts of gears.

The first rotating member 5 is formed in a shaft shape, with a portion exposed from the housing 3 formed solid and a portion located inside the housing 3 formed hollow. The first rotating member 5 is rotatably supported by the housing 3 via a bearing 15. A seal member 17 is disposed radially between the first rotating member 5 and the housing 3, separating the inside and outside of the housing 3.

A connecting portion 19 having a spline shape is formed on an outer periphery of the portion of the first rotating member 5 exposed from the housing 3 so as to be connected to the input side mechanism so as to be rotatable together with the input side mechanism. The first rotating member 5 receives a driving force from the input side mechanism via a connecting portion 19, and transmits the driving force to the second rotating member 7 via the connection and disconnection portion 9.

The second rotating member 7 is formed in a shaft shape parallel to an axis of the first rotating member 5, and is formed in a hollow shape with an open portion located on an outer side of the housing 3 and a closed portion located inside the housing 3. The second rotating member 7 is rotatably supported by the housing 3 via a bearing 21, and is supported rotatably relative to the first rotating member 5 via a bearing 23. A seal member 25 is disposed radially between the second rotating member 7 and the housing 3, separating the inside and outside of the housing 3.

A connecting portion 27 having a spline shape that is connected to the output side mechanism so as to be rotatable together with the output side mechanism is formed on an inner circumference of the second rotating member 7. The second rotating member 7 transmits the driving force transmitted via the connection and disconnection portion 9 to the output side mechanism via the connecting portion 27.

The connection and disconnection portion 9 includes a clutch hub 29, a clutch housing 31, and a plurality of clutch plates.

The clutch hub 29 is formed in a cylindrical shape and is disposed on an outer periphery side of the first rotating member 5. The clutch hub 29 is fixed to an end of the first rotating member 5 by joining means such as welding so as to be able to rotate integrally with the first rotating member 5. A spline-shaped engagement portion is formed on an outer periphery of the clutch hub 29.

The clutch housing 31 is formed in a cylindrical shape with a bottom, and the cylindrical portion is disposed on the outer periphery of the clutch hub 29. The portion of the clutch housing 31 that forms the bottom is formed from a single member that is continuous with an outer periphery of the second rotating member 7 and rotates integrally with the second rotating member 7. A thrust bearing 33 that allows rotation of the clutch housing 31 and receives axial movement of the clutch housing 31 is disposed between the clutch housing 31 and the housing 3 in an axial direction. A spline-shaped engagement portion is formed on an inner periphery of the clutch housing 31.

A plurality of clutch plates consists of a plurality of inner clutch plates and a plurality of outer clutch plates. The plurality of inner clutch plates are axially movable in an engagement portion of the clutch hub 29 and are engaged so as to be rotatable together with the first rotating member 5. The plurality of outer clutch plates are arranged alternately in the axial direction relative to the plurality of inner clutch plates, are axially movable in an engagement portion of the clutch housing 31, and are engaged so as to be rotatable together with the second rotating member 7.

The connection and disconnection portion 9, which has the plurality of clutch plates, is a controlled friction clutch that has sliding friction and can intermediately control transmitted torque. A pressure plate is disposed at an end of the plurality of clutch plates and is engaged with the engagement portion of the clutch housing 31 so as to be movable axially and rotate together with the clutch housing 31. When the actuator 11 is operated, the pressure plate is moved axially to press the plurality of clutch plates.

The actuator 11 includes a cam mechanism 35, a speed change mechanism 37, and an electric motor 41 as an electric component 39.

The cam mechanism 35 is a ball cam mechanism that converts a rotational force generated by the speed change mechanism 37 into an axial operating force. The cam mechanism 35 includes a fixed ring 43, a cam ring 45, and a cam ball 47.

The fixed ring 43 is prevented from rotating on the housing 3 via an engagement portion provided on an outer periphery, and a movement of the fixed ring 43 in the axial direction is restricted. The cam ring 45 faces the fixed ring 43 in the axial direction and is arranged to be movable and rotatable in the axial direction. A thrust bearing 49 is arranged between the cam ring 45 and the pressure plate of the connection and disconnection portion 9 in the axial direction, allowing relative rotation between them and transmitting an axial movement of the cam ring 45 to the pressure plate. A plurality of cam surfaces is formed in a circumferential direction on axially opposing surfaces of the fixed ring 43 and the cam ring 45.

The cam balls 47 are respectively interposed between a plurality of cam surfaces of the fixed ring 43 and cam ring 45. When the cam ring 45 rotates, a differential rotation occurs between the fixed ring 43 and the cam ring 45, and the cam ball 47 generates a cam thrust force that moves the cam ring 45 in a connection direction of the connection and disconnection portion 9.

The speed change mechanism 37 is a planetary gear mechanism that decelerates the rotation of the electric motor 41. The speed change mechanism 37 includes a gear portion formed on an inner circumference of the fixed ring 43, a gear portion formed on an inner circumference of the cam ring 45, a planetary gear 51, and a carrier 53.

The planetary gear 51 has a different number of teeth than the gear portion of the fixed ring 43 and the gear portion of the cam ring 45, and meshes with the gear portion of the fixed ring 43 and the gear portion of the cam ring 45. The carrier 53 supports the planetary gear 51 so that the planetary gear 51 can rotate on its own axis. The carrier 53 is provided integrally with a rotor 57 of the electric motor 41, and is rotated integrally with the rotor 57 by the rotation of the rotor 57. The speed change mechanism 37 decelerates the rotation from the electric motor 41 and rotates the cam ring 45 of the cam mechanism 35.

The electric motor 41 includes a stator 55 and a rotor 57.

The stator 55 is formed in an annular shape and includes a core and an electromagnetic coil. The core is made of a magnetic material. Further, a plurality of cores is arranged in the circumferential direction, and prevented from rotating relative to the housing 3. The electromagnetic coil is wound a predetermined number of times around the outer periphery of each of the plurality of cores, and generates magnetic flux along the axial direction when electricity is passed through the electromagnetic coil. A lead wire (not illustrated) that is pulled out to the outside of the housing 3 is electrically connected to an end of the electromagnetic coil. The lead wire is electrically connected to a controller (not illustrated) that controls an operation of each mechanism installed in the vehicle.

The rotor 57 is made of a magnetic material and is formed in an annular shape. The rotor 57 is restricted in its axial movement relative to the housing 3 via a restricting portion formed on its outer periphery, and its inner periphery is supported by a bearing 59 so as to be rotatable relative to the first rotating member 5. The rotor 57 is disposed axially opposite the stator 55 with a small gap therebetween that allows magnetic flux to pass through. In addition, a plurality of protrusions are formed on the axially opposing surfaces of the rotor 57 and stator 55 so as to be staggered in a radial direction in order to increase an area through which magnetic flux passes. The rotor 57 is rotated by magnetic flux generated by passing electricity through the electromagnetic coil of the stator 55.

In such an actuator 11, in the electric motor 41, a current controlled by the controller is applied to the electromagnetic coil of the stator 55 according to fastening torque to be obtained in the connection and disconnection portion 9. When the current is applied to the electromagnetic coil of the stator 55, the rotor 57 rotates, which is decelerated by the speed change mechanism 37 and transmitted to the cam mechanism 35. In the cam mechanism 35, the cam ring 45 is rotated by the rotation from the speed change mechanism 37, and a differential rotation occurs between the fixed ring 43 and the cam ring 45. The differential rotation between the fixed ring 43 and the cam ring 45 causes the cam ball 47 to move circumferentially between the cam surfaces. The movement of the cam ball 47 generates an axial cam thrust force, and the cam ring 45 moves in the connection direction of the connection and disconnection portion 9. As the cam ring 45 moves, the plurality of clutch plates is pressed through the pressure plate, making the connection and disconnection portion 9 in a connected state. The connection of the connection and disconnection portion 9 enables power transmission between the first rotating member 5 and the second rotating member 7.

The temperature sensor 13 is provided inside the housing 3 in the stator 55 of the electric motor 41 as the electric component 39. The temperature sensor 13 may be provided on the stator 55 side, for example, on a fixed portion of the stator 55 fixed to the housing 3. By providing the temperature sensor 13 on the stator 55 side, the temperature sensor 13 can be handled as a sub-assembly of the actuator 11, improving case of assembly. In addition, the temperature sensor 13 may be provided on a fixed portion of the housing 3 to which the stator 55 is fixed. A lead wire (not illustrated) that is pulled out to the outside of the housing 3 is electrically connected to the temperature sensor 13. The lead wire is electrically connected to the controller.

The temperature sensor 13 detects the temperature inside the housing 3 and outputs the temperature to the controller. The controller estimates the temperature of the connection and disconnection portion 9 from the temperature detected by the temperature sensor 13 and controls the supply of electricity to the electromagnetic coil according to a temperature condition of the connection and disconnection portion 9. When the controller estimates the temperature of the connection and disconnection portion 9, by placing the temperature sensor 13 inside the housing 3, the estimation accuracy can be significantly improved compared to when the temperature sensor 13 is placed on an external surface of the housing 3.

The lead wire of the temperature sensor 13 is integrated with the lead wire of the electromagnetic coil and is pulled out to the outside of the housing 3 from a pull-out portion provided in the housing 3. As a result, there is no need to provide a new structure for pulling out the lead wire of the temperature sensor 13 from the housing 3, and thus the structure of the housing 3 does not become complicated. In addition, by providing the temperature sensor 13 in the electric component 39 arranged inside the housing 3, there is no need to consider a lubricating environment of lubricating oil, as would be the case when the temperature sensor 13 is newly disposed in a lubricating oil reservoir.

The temperature sensor 13 is disposed below an oil level L of the lubricating oil inside the housing 3. By disposing the temperature sensor 13 below the oil level L of the lubricating oil, the temperature sensor 13 is disposed in the lubricating oil. This allows the temperature sensor 13 to detect the temperature of the lubricating oil more accurately, and further improves the estimation accuracy of the temperature of the connection and disconnection portion 9.

The temperature sensor 13 is arranged on the stator 55 side, for example, on an outer surface of the stator 55, an outer surface of the fixed portion of the stator 55, and an outer surface of the fixed portion of the housing 3, and is exposed inside the housing 3. The temperature sensor 13 exposed inside the housing 3 is an oil-resistant temperature sensor and can come into contact with the lubricating oil. By having the temperature sensor 13 come into contact with the lubricating oil, the temperature of the lubricating oil can be detected more accurately, and thus the accuracy of estimating the temperature of the connection and disconnection portion 9 can be further improved.

Here, the temperature sensor 13 may be arranged on the stator 55 side, for example, inside the stator 55, inside the fixed part of the stator 55, or inside the fixed part of the housing 3 so as not to be exposed inside the housing 3. The temperature sensor 13 that is not exposed inside the housing 3 cannot come into contact with lubricating oil. Therefore, the temperature sensor 13 does not need to be oil resistant, and cost of the temperature sensor 13 can be reduced. In addition, by arranging the temperature sensor 13 inside the stator 55 side, the temperature sensor 13 does not interfere with surrounding components, and thus durability of the temperature sensor 13 can be improved.

Such a drive device 1 includes the housing 3 accommodating the lubricating oil, and a pair of rotating members, the first rotating member 5 and the second rotating member 7, accommodated in the housing 3 and capable of relative rotation. The drive device 1 also includes the connection and disconnection portion 9 that connects and disconnects the power transmitted between the first rotating member 5 and the second rotating member 7, and the actuator 11 that is accommodated in the housing 3 and has the electric component 39 that actuates the connection and disconnection portion 9. The electric component 39 is also provided with the temperature sensor 13 that detects the temperature inside the housing 3.

The temperature sensor 13 is provided in the electric component 39 accommodated in the housing 3, and is therefore disposed inside the housing 3. As a result, the accuracy of estimating the temperature of the connection and disconnection portion 9 can be significantly improved compared to when the temperature sensor 13 is disposed on the external surface of the housing 3. Also, by providing the temperature sensor 13 in the electric component 39, the lead wire of the temperature sensor 13 can be integrated with the lead wire of the electric component 39 and pulled out from the housing 3 to the outside. As a result, there is no need to provide a new structure for pulling out the lead wire of the temperature sensor 13 from the housing 3, and thus the structure of the housing 3 does not become complicated. In addition, by providing the temperature sensor 13 in the electric component 39 disposed inside the housing 3, there is no need to consider the lubricating environment of the lubricating oil, as would be the case when the temperature sensor 13 is newly disposed in a lubricating oil reservoir.

Therefore, in such a drive device 1, the estimation accuracy of the temperature of the connection and disconnection portion 9 can be maintained without complicating the structure of the housing 3.

The electric component 39 may be made up of the electric motor 41 having the stator 55 fixed to the housing 3 and the rotor 57 that is rotated when electricity is applied to the stator 55. The temperature sensor 13 is provided on the stator 55 side.

By providing the temperature sensor 13 on the stator 55 side, the temperature sensor 13 can be handled as a sub-assembly of the actuator 11, thereby improving ease of assembly.

The temperature sensor 13 may be disposed below the oil level L of the lubricating oil.

Therefore, the temperature sensor 13 is placed in the lubricating oil, and the temperature sensor 13 can detect the temperature of the lubricating oil more accurately, thereby further improving the estimation accuracy of the temperature of the connection and disconnection portion 9.

The temperature sensor 13 may be disposed so as to be in contact with the lubricating oil directly.

Therefore, by bringing the temperature sensor 13 into contact with the lubricating oil, the temperature of the lubricating oil can be detected more accurately, and thus the accuracy of estimating the temperature of the connection and disconnection portion 9 can be further improved.

The temperature sensor 13 may be disposed inside the stator 55 side so as not to come into contact with the lubricating oil directly.

For this reason, the temperature sensor 13 does not need to be oil resistant, which allows for a reduction in cost of the temperature sensor 13. In addition, by arranging the temperature sensor 13 inside the stator 55 side, the temperature sensor 13 does not interfere with surrounding components, and thus the durability of the temperature sensor 13 can be improved.

Figure 2:
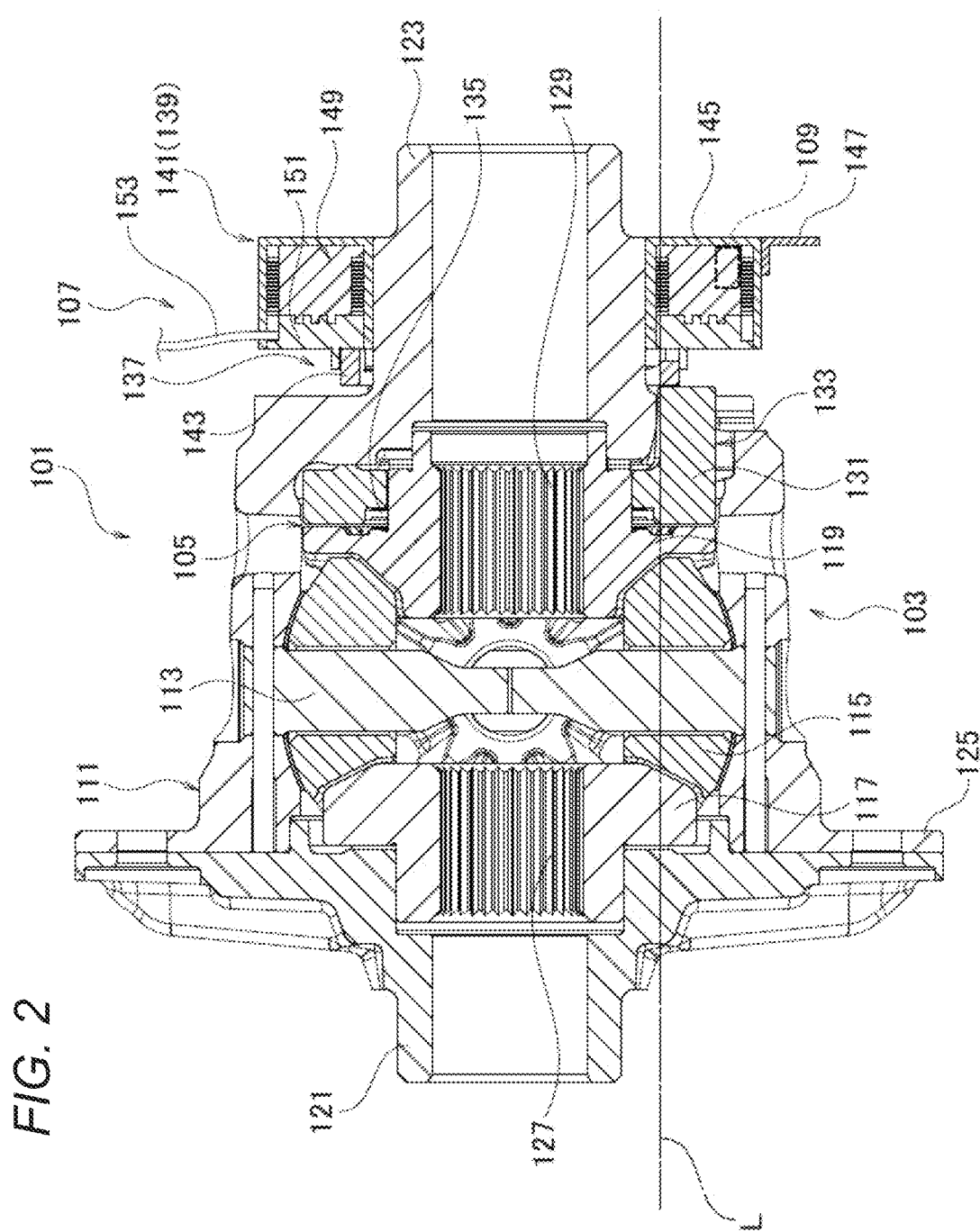
FIG. 2 is a cross-sectional view of a drive device according to a second embodiment.

A second embodiment will be described with reference to FIG. 2. As illustrated in FIG. 2, a drive device 101 according to the second embodiment is, for example, a differential device disposed between left and right wheels in a power transmission path of a vehicle. The drive device 101 outputs a driving force from a drive source to the left and right wheels, and allows the left and right wheels to rotate differentially when a differential rotation occurs between the left and right wheels. The drive device 101 has a connection and disconnection portion 105 that connects and disconnects the differential between the left and right wheels. When the connection and disconnection portion 105 is in a connected state, the drive device 101 locks the differential between the left and right wheels. On the other hand, when the connection and disconnection portion 105 is in a disconnected state, the drive device 101 unlocks the differential between the left and right wheels.

As illustrated in FIG. 2, the drive device 101 includes a housing (not illustrated), a differential mechanism 103, the connection and disconnection portion 105, an actuator 107, and a temperature sensor 109.

Although not illustrated, the housing is a static system component fixed to the vehicle and is made up of, for example, a plurality of separate components. The plurality of separate components are fixed via a plurality of fastening means such as bolts to form an internal accommodation space for accommodating each component. The housing accommodates lubricating oil that lubricates and cools sliding parts of each component and meshing parts of the gears.

The differential mechanism 103 includes a differential case 111, a pinion shaft 113, a pinion gear 115, and a pair of side gears 117 and 119. A pair of rotating members is the differential case 111 and the side gear 119.

The differential case 111 is rotatably supported on the housing via bearings (not illustrated) on an outer periphery of each of bosses 121 and 123 formed on both axial sides. The differential case 111 is formed with a flange portion 125 to which a ring gear (not illustrated) is fixed. The ring gear fixed to the flange portion 125 meshes with, for example, a power transmission gear (not illustrated) that transmits a driving force from a drive source, and the driving force is input to rotate the differential case 111. The differential case 111 accommodates the pinion shaft 113, the pinion gear 115, the pair of side gears 117 and 119, and the like.

The pinion shaft 113 has one long pinion shaft and two short pinion shafts. The long pinion shaft has both ends engaged with holes formed in the differential case 111 and is rotated integrally with the differential case 111. The short pinion shaft has one end engaged with a hole formed in a middle of the long pinion shaft and the other end engaged with a hole formed in the differential case 111 and prevented from coming off by a pin, and is rotated integrally with the differential case 111. The pinion gears 115 are supported on the outer end sides of the pinion shafts 113.

A plurality of (four in this example) pinion gears 115 are arranged at equal intervals around a circumferential direction of the differential case 111. The plurality of pinion gears 115 are each supported on the end side of the pinion shaft 113 and revolve with the rotation of the differential case 111. The pinion gears 115 are rotatably supported on the pinion shaft 113 so as to be driven to rotate when a differential rotation occurs between a pair of meshed side gears 117 and 119. The pinion gears 115 transmit the driving force input to the differential case 111 to the pair of side gears 117 and 119.

The pair of side gears 117 and 119 are accommodated in the differential case 111 so as to be capable of relative rotation. The pair of side gears 117 and 119 each mesh with the pinion gear 115. On an inner periphery of the pair of side gears 117 and 119, output portions 127 and 129 having a spline shape that output a driving force transmitted to the pair of side gears 117 and 119 are provided. The output portions 127 and 129 are connected to a pair of output shafts (not illustrated) that are connected to the left and right wheels so as to be capable of integrally rotating, for example, so as to be integrally rotatable.

The differential between the pair of side gears 117 and 119 in this type of differential mechanism 103 is locked by the connection of the connection and disconnection portion 105, and the driving force transmitted to the pair of side gears 117 and 119 is output evenly to the left and right wheels. In this way, the drive device 101, which has the connection and disconnection portion 105 that connects and disconnects the differential of the differential mechanism 103, is a differential device with a so-called differential-lock function.

The connection and disconnection portion 105 is provided between the side gear 119 and a clutch member 131.

The clutch member 131 is formed in an annular shape, and the clutch member 131's base formed of a circumferentially continuous member is arranged axially movable between a wall of the differential case 111 and a back surface side of the side gear 119. An engagement portion 133 that engages with the differential case 111 so as to be rotatable together with the differential case 111 is provided on the wall side of the differential case 111 of the clutch member 131, and the connection and disconnection portion 105 is provided on the back surface side of the side gear 119 of the clutch member 131.

The engagement portion 133 consists of a plurality of protrusions provided at equal circumferential intervals on the base of the clutch member 131, and a plurality of holes provided at equal circumferential intervals in the wall of the differential case 111, penetrating in the axial direction. By engaging the protrusions and holes in a rotational direction, the clutch member 131 is prevented from rotating relative to the differential case 111, and the clutch member 131 and the differential case 111 can rotate together.

A cam is provided in the engagement portion 133 to move the clutch member 131 in a connection direction of the connection and disconnection portion 105. The cam is a cam surface of the same inclination formed on each of opposing surfaces on both circumferential sides of the protrusion and the hole. When the clutch member 131 is moved in the connection direction of the connection and disconnection portion 105 and a rotational engagement action occurs in the connection and disconnection portion 105, the cam surfaces of the cam are engaged by the rotation of differential case 111. The engagement of the cam surfaces further moves the clutch member 131 in the engagement direction of the connection and disconnection portion 105, strengthening the connection of the connection and disconnection portion 105.

The connection and disconnection portion 105 is provided between the clutch member 131 and the back surface side of the side gear 119 in an axial direction, and a plurality of meshing teeth are formed in the circumferential direction on each of the clutch member 131 and the side gear 119 to mesh with each other. The connection and disconnection portion 105 has meshing teeth, which allow the clutch member 131 and the side gear 119 to be connected together so that they can be integrated, that is, the differential case 111 and the side gear 119 are connected so that they can rotate together, and the differential of the differential mechanism 103 is locked.

A biasing member 135 is provided radially inside the connection and disconnection portion 105 between the clutch member 131 and the back surface side of the side gear 119 in the axial direction, and constantly biases the clutch member 131 in a direction of disconnecting the connection and disconnection portion 105. The biasing member 135 moves the clutch member 131 in the direction of disconnecting the connection and disconnection portion 105, disconnecting the connection and disconnection portion 105, and unlocking the differential of the differential mechanism 103. The connection and disconnection state of the connection and disconnection portion 105 is controlled by the actuator 107.

The actuator 107 includes a conversion mechanism 137 and an electric motor 141 as an electric component 139.

The conversion mechanism 137 is a cam mechanism that converts a rotational force of the electric motor 141 into an operating force in the axial direction. The conversion mechanism 137 is equipped with a cam ring 143.

The cam ring 143 is formed in an annular shape, and an outer surface is a cam surface inclined in the axial direction. The cam ring 143 is provided with a plurality of pressing portions that come into contact with axial end surfaces of the protrusions of the clutch member 131. The cam ring 143 engages the cam surface with the rotor 151 of the electric motor 141, and is moved in the connection direction of the connection and disconnection portion 105 by the rotation of the rotor 151. The movement of the cam ring 143 presses the clutch member 131 via the pressing portion, and the clutch member 131 moves in the connection direction of the connection and disconnection portion 105 against the biasing force of the biasing member 135, and the connection and disconnection portion 105 is connected. In addition, a roller or the like that promotes an axial movement of the cam ring 143 may be interposed between the cam surfaces of the cam ring 143 and the rotor 151.

The electric motor 141 is accommodated inside a motor housing 145 that is arranged on an outer periphery of the boss 123 of the differential case 111. The motor housing 145 is open on an axial side facing the clutch member 131, and an engagement portion 147 integrally formed on an outer periphery engages with the housing to prevent rotation relative to the housing. The electric motor 141 includes a stator 149 and a rotor 151.

The stator 149 is formed in an annular shape and includes a core and an electromagnetic coil. The core is made of a magnetic material. Also, a plurality of cores is arranged in the circumferential direction, and are fixed to the motor housing 145. The electromagnetic coil is wound a predetermined number of times around the outer periphery of each of the plurality of cores, and generates a magnetic flux along the axial direction when electricity is passed through the electromagnetic coil. A lead wire 153 that is pulled out from the motor housing 145 is electrically connected to an end of the electromagnetic coil. The lead wire 153 pulled out from the motor housing 145 is also pulled out from the housing and is electrically connected to a controller (not illustrated) that controls an operation of each mechanism installed in the vehicle.

The rotor 151 is made of a magnetic material and is formed in an annular shape. The rotor 151 is rotatably arranged inside the motor housing 145. The rotor 151 is arranged facing the stator 149 in the axial direction with a small gap that allows magnetic flux to pass through. In addition, a plurality of protrusions is formed on axially opposing surfaces of the rotor 151 and the stator 149 so as to be staggered in a radial direction in order to increase an area through which magnetic flux passes. The rotor 151 is rotated by the magnetic flux generated by passing electricity through the electromagnetic coil of the stator 149.

When such an actuator 107 is to connect the connection and disconnection portion 105, the actuator 107 applies electricity to the electromagnetic coil of the stator 149 to rotate the rotor 151. The rotation of the rotor 151 causes the conversion mechanism 137 to move the cam ring 143 in the connection direction of the connection and disconnection portion 105. The movement of the cam ring 143 presses the clutch member 131 via the pressing portion, and the clutch member 131 moves in the connection direction of the connection and disconnection portion 105 against a biasing force of the biasing member 135, and the connection and disconnection portion 105 is connected. The connection of the connection and disconnection portion 105 allows the differential case 111 and the side gear 119 to rotate together, and the differential mechanism 103 is locked.

On the other hand, when disconnecting the connection and disconnection portion 105, the actuator 107 stops applying electricity to the electromagnetic coil of the stator 149. By stopping applying electricity to the electromagnetic coil, the biasing member 135 moves the clutch member 131 in a direction of disconnecting the connection and disconnection portion 105, and thus the connection of the connection and disconnection portion 105 is disconnected. By disconnecting the connection and disconnection portion 105, the differential case 111 and the side gear 119 become rotatable relative to each other, and the differential mechanism 103 becomes unlocked.

The temperature sensor 109 is provided in the stator 149 of the electric motor 141 as the electric component 139 inside the housing. The temperature sensor 109 only needs to be provided on the stator 149 side. For example, the temperature sensor 109 may be provided on the motor housing 145 to which the stator 149 is fixed. By providing the temperature sensor 109 on the stator 149 side, the temperature sensor 109 can be handled as a sub-assembly of the actuator 107, improving the case of assembly. In addition, the temperature sensor 109 may be provided, for example, near a pull-out portion of the housing where the lead wire 153 pulled out from the motor housing 145 is pulled out to the outside. The temperature sensor 109 is electrically connected to a lead wire (not illustrated) pulled out to the outside of the housing. The lead wire is electrically connected to the controller.

The temperature sensor 109 detects the temperature inside the housing and outputs the temperature to the controller. The controller estimates the temperature of the connection and disconnection portion 105 from the temperature detected by the temperature sensor 109 and controls the supply of electricity to the electromagnetic coil according to a temperature condition of the connection and disconnection portion 105. When the controller estimates the temperature of the connection and disconnection portion 105, by placing the temperature sensor 109 inside the housing, the estimation accuracy can be significantly improved compared to when the temperature sensor 109 is placed on an external surface of the housing.

A lead wire of the temperature sensor 109 is gathered together with the lead wire 153 of the electromagnetic coil and is pulled out to the outside of the housing from a pull-out portion provided in the housing. As a result, there is no need to provide a new structure for pulling out the lead wire of the temperature sensor 109 from the housing, and the structure of the housing does not become more complicated. In addition, by providing the temperature sensor 109 in the electric component 139 arranged inside the housing, there is no need to consider a lubricating environment of lubricating oil, as would be the case when the temperature sensor 109 is newly disposed in a lubricating oil reservoir.

The temperature sensor 109 is disposed inside the housing below an oil level L of the lubricating oil. By disposing the temperature sensor 109 below the oil level L of the lubricating oil, the temperature sensor 109 is disposed in the lubricating oil. This allows the temperature sensor 109 to detect the temperature of the lubricating oil more accurately, and further improves the accuracy of estimating the temperature of the connection and disconnection portion 105.

The temperature sensor 109 is disposed on the stator 149 side, for example, on an outer surface of the motor housing 145, and is exposed inside the housing. The temperature sensor 109 exposed inside the housing is an oil-resistant temperature sensor and can come into contact with lubricating oil. By bringing the temperature sensor 109 into contact with the lubricating oil, the temperature of the lubricating oil can be detected more accurately, and the accuracy of estimating the temperature of the connection and disconnection portion 105 can be further improved.

Here, the temperature sensor 109 may be arranged on the stator 149 side, for example, inside the stator 149 or inside the motor housing 145 so as not to be exposed inside the housing. The temperature sensor 109 that is not exposed inside the housing cannot come into contact with the lubricating oil. For this reason, the temperature sensor 109 does not need to be oil resistant, and the cost of the temperature sensor 109 can be reduced. In addition, by arranging the temperature sensor 109 inside the stator 149 side, the temperature sensor 109 does not interfere with surrounding components, and thus the durability of the temperature sensor 109 can be improved.

Such a drive device 101 includes the housing that accommodates lubricating oil, and a pair of rotating members, the differential case 111 and the side gear 119, that are accommodated in the housing and capable of relative rotation. The drive device also includes the connection and disconnection portion 105 that connects and disconnects the power transmitted between the differential case 111 and the side gear 119, and the actuator 107 that is accommodated in the housing and has the electric component 139 that actuates the connection and disconnection portion 105. The electric component 139 is provided with the temperature sensor 109 that detects the temperature inside the housing.

The temperature sensor 109 is provided in the electric component 139 accommodated in the housing, and is therefore disposed inside the housing. As a result, the accuracy of estimating the temperature of the connection and disconnection portion 105 can be significantly improved compared to when the temperature sensor 109 is disposed on the external surface of the housing. Also, by providing the temperature sensor 109 in the electric component 139, the lead wire of the temperature sensor 109 can be integrated with the lead wire 153 of the electric component 139 and pulled out from the housing to the outside. As a result, there is no need to provide a new structure for pulling out the lead wire of the temperature sensor 109 from the housing, and thus the structure of the housing does not become complicated. In addition, by providing the temperature sensor 109 in the electric component 139 disposed inside the housing, there is no need to consider the lubricating environment of the lubricating oil, as would be the case when the temperature sensor 109 is newly disposed in a lubricating oil reservoir.

Therefore, in such a drive device 101, the estimation accuracy of the temperature of the connection and disconnection portion 105 can be maintained without complicating the structure of the housing.

The electric component 139 includes the electric motor 141 having the stator 149 fixed to the housing and the rotor 151 that rotates when electricity is applied to the stator 149. The temperature sensor 109 is provided on the stator 149 side.

By providing the temperature sensor 109 on the stator 149 side, the temperature sensor 109 can be handled as a sub-assembly of the actuator 107, thereby improving case of assembly.

Moreover, the temperature sensor 109 is disposed below the oil level L of the lubricating oil.

For this reason, the temperature sensor 109 is disposed in the lubricating oil, and the temperature sensor 109 can detect the temperature of the lubricating oil more accurately, thereby further improving the accuracy of estimating the temperature of the connection and disconnection portion 105.

Moreover, the temperature sensor 109 is disposed so as to be able to come into contact with the lubricating oil.

Therefore, by having the temperature sensor 109 come into contact with the lubricating oil, the temperature of the lubricating oil can be detected more accurately, and thus the accuracy of estimating the temperature of the connection and disconnection portion 105 can be further improved.

Further, the temperature sensor 109 is disposed inside the stator 149 side so as not to come into contact with the lubricating oil.

For this reason, the temperature sensor 109 does not need to be oil resistant, which allows for a reduction in cost of the temperature sensor 109. In addition, by arranging the temperature sensor 109 inside the stator 149 side, the temperature sensor 109 does not interfere with surrounding components, and thus the durability of the temperature sensor 109 can be improved.

Although certain embodiments and their modifications are described above, embodiments are not limited to these, and various modifications are possible within the scope of the gist of the embodiments.

For example, the electric component is an electric motor, but is not limited to this and may be any part, such as an electromagnet.

Furthermore, the pair of rotating members is not limited to those described above. For example, an outer case and an inner case in a free running differential may be set as the pair of rotating members, and the pair of rotating members may be any type.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary. In the preceding description, various operating parameters and components are described for one or more embodiments. These specific parameters and components are included as examples and are not meant to be limiting.

Reference in the preceding description to "one example," "an example," "one embodiment," or "an embodiment", means that a particular feature, structure, or characteristic described in connection with the example is included in at least one example or implementation including one or more but not necessarily all innovative features or components. References to various examples, embodiments or implementations do not necessarily refer to the same example, embodiment or implementation each time it appears.

What is claimed is:

1. A drive device, comprising:
   a housing in which lubricating oil is accommodated;
   a pair of rotating members accommodated in the housing so as to be capable of rotating relative to one another;
   a connection and disconnection portion for connecting and disconnecting power transmitted between the pair of rotating members;
   an actuator accommodated in the housing and having an electric component that actuates the connection and disconnection portion, wherein the electric component is provided with a temperature sensor that detects a temperature inside the housing; and
   wherein the electric component includes an electric motor having a stator fixed to the housing and a rotor that is rotated by applying electricity to the stator, and wherein the temperature sensor is provided on a side of the stator.

2. The drive device according to claim 1, wherein the temperature sensor is disposed below an oil level of the lubricating oil.

3. The drive device according to claim 1, wherein the temperature sensor is disposed so as to be in directly contact with the lubricating oil.

4. The drive device according to claim 1, wherein the temperature sensor is disposed inside the stator so as not to be in direct contact with the lubricating oil.

* * * * *